United States Patent [19]

Lewis

[11] 4,418,259

[45] Nov. 29, 1983

[54] METHOD AND APPARATUS OF UNIFORM INDUCTION HEATING OF AN ELONGATED WORKPIECE

[75] Inventor: John C. Lewis, Dundas, Canada

[73] Assignee: Park-Ohio Industries, Inc., Shaker Heights, Ohio

[21] Appl. No.: 294,932

[22] Filed: Aug. 21, 1981

[51] Int. Cl.³ .............................................. H05B 6/40
[52] U.S. Cl. ............................ 219/10.43; 219/10.41; 219/10.57; 219/10.69; 219/10.79
[58] Field of Search ............... 219/10.41, 10.43, 10.57, 219/10.49, 10.69, 10.71, 10.75, 10.67, 10.79; 266/129, 124; 148/146, 150, 154

[56] References Cited

U.S. PATENT DOCUMENTS

| | | |
|---|---|---|
| 1,690,612 | 11/1928 | Anderson . |
| 1,764,068 | 6/1930 | Crook . |
| 2,281,850 | 5/1942 | McKinney . |
| 2,490,104 | 12/1949 | Strickland . |
| 2,811,623 | 10/1957 | Guthrie ............................ 219/10.41 |
| 3,057,985 | 10/1962 | Biringer .......................... 219/10.41 |
| 3,489,620 | 1/1970 | Current . |
| 3,596,037 | 7/1971 | Seulin et al. ...................... 219/10.79 |
| 3,604,882 | 9/1971 | Seyfried .......................... 219/10.69 |
| 3,610,861 | 10/1971 | Storey ......................... 219/10.69 X |
| 3,743,808 | 7/1973 | Kasper ............................ 219/10.77 |
| 3,784,780 | 1/1974 | Laughlin et al. ............. 219/10.71 X |
| 4,075,450 | 2/1978 | Lavins, Jr. ...................... 219/10.71 |
| 4,093,839 | 6/1978 | Moliterno et al. ........... 219/10.41 X |
| 4,117,293 | 9/1978 | Wicker et al. ................... 219/10.41 |
| 4,158,758 | 6/1979 | Kunioka et al. ................. 219/10.43 |
| 4,289,944 | 9/1981 | Reese .............................. 219/10.41 |
| 4,307,276 | 12/1981 | Kurata et al. .................... 219/10.41 |

FOREIGN PATENT DOCUMENTS

| | | |
|---|---|---|
| 1508430 | 10/1969 | Fed. Rep. of Germany . |
| 1533955 | 2/1970 | Fed. Rep. of Germany . |
| 2801661 | 2/1979 | Fed. Rep. of Germany . |
| 815003 | 7/1937 | France . |
| 1557249 | 1/1969 | France . |
| 2360674 | 3/1978 | France . |

OTHER PUBLICATIONS

U.S. Pat. Application No. 320,550, Wagar, 11/81.
U.S. Pat. Application No. 390,409, Lewis, 6/82.
U.S. Pat. Application No. 358,446, Lewis, 3/82.

Primary Examiner—B. A. Reynolds
Assistant Examiner—Philip H. Leung
Attorney, Agent, or Firm—Body, Vickers & Daniels

[57] ABSTRACT

A method for uniformly heating an elongated workpiece having a first portion with uniform cross-section over a major portion of the workpiece length and a second portion having a larger cross-section than the first portion. A multi-turn inductor is operatively mounted on a carriage or the like and is coaxially disposed about an elongated workpath. The carriage is selectively movable axially of the workpath from a first or home position. As the workpiece first portion is fed along the workpath at some preselected rate of travel into and through the inductor, it is heated to a desired temperature over the length thereof. The inductor carriage is energized as the enlarged workpiece second portion enters the inductor so that the inductor will travel along the workpath with the workpiece. Such travel increases the heating time for the second portion so that it too is heated to the desired temperature. After a predetermined time interval, the carriage movement is reversed back toward the first or home position. The method is adapted to use with workpieces having plural enlarged areas spaced therealong and is adaptable to simultaneous heating of a plurality of workpieces with plural inductors.

16 Claims, 8 Drawing Figures

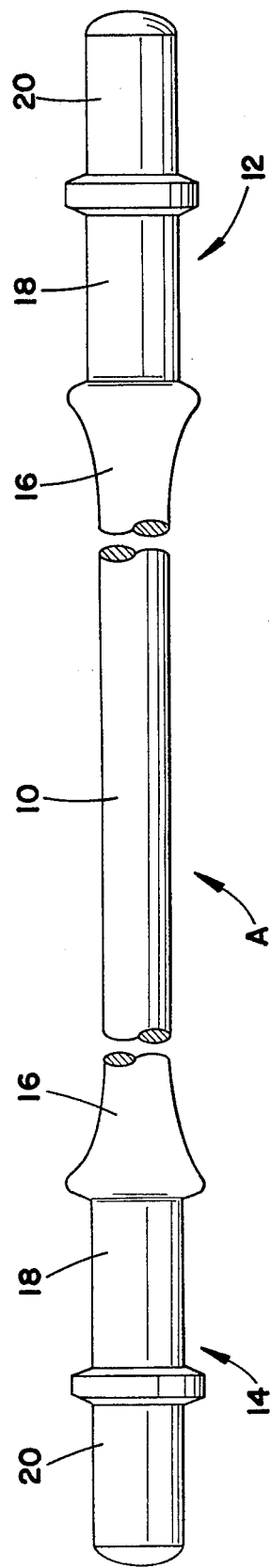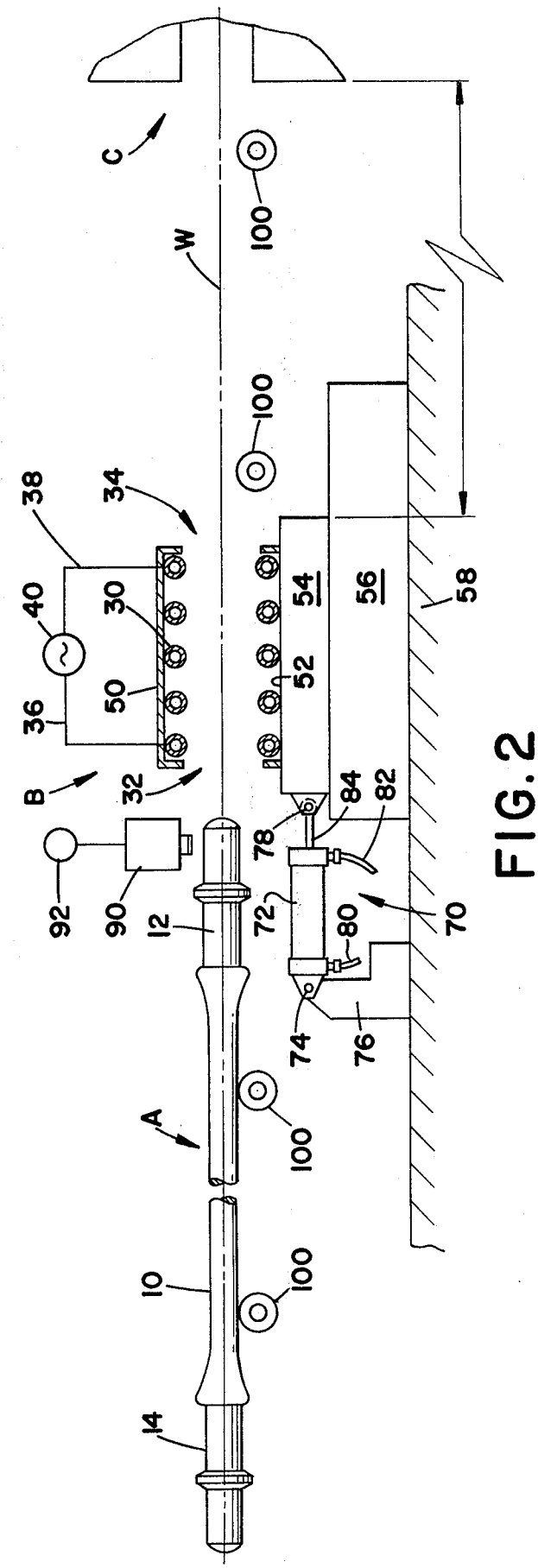
FIG.1
FIG.2

METHOD AND APPARATUS OF UNIFORM INDUCTION HEATING OF AN ELONGATED WORKPIECE

BACKGROUND OF THE INVENTION

This invention relates to the art of induction heating and, more particularly, to a method for uniformly heating an elongated workpiece having a uniform cross-section over the major portion of its length with at least one enlargement disposed therealong.

The invention is particularly applicable to heating sucker rods which are employed in oil wells and the like and will be described with particular reference thereto. However, it will be appreciated that the invention has broader applications and may be used for inductively heating a variety of elongated workpieces having one or more areas of enlarged cross-section disposed therealong.

Sucker rods are utilized in the petroleum industry as a connecting link between a down hole oil well pump and the lifting or pumping device on the surface. Each rod is quite long, normally being on the order of magnitude of 25–30 feet. A major portion of the rod has a uniform cross-section with an enlargement being included adjacent each end thereof. These enlargements variously facilitate interconnecting a plurality of the rods in an end to end relationship with each other. While there are a number of specific or detailed modifications which may be included in the sucker rod configurations of different manufacturers, almost all such rods have the foregoing general conformation and characteristics.

As one of the manufacturing steps, the sucker rods are heated to some predetermined temperature and then passed through an electrostatic spray chamber for having a coating of paint or plastic-like material applied thereto. Since the rods need only be surface heated for this purpose, induction type heating finds particular use in this environment. However, because sucker rods do not have uniform cross-sections throughout the entirety of their lengths, it is necessary to in some way compensate for the heating variations which otherwise occur at the enlargements adjacent the rod ends. Unless each rod is heated to a uniform temperature over the entire length thereof, the paint or plastic-like coating subsequently applied will not have a uniform consistency, thickness, etc. thereon, particularly as between the elongated rod portion and the enlargements.

A number of different arrangements to compensate for this difficulty have previously been proposed, developed and attempted. Such solutions include voltage regulation for the inductor, delay on and off timers, various alternative inductor configurations and the like. However, none of these proposed modifications have satisfactorily solved the problem of uniformly heating sucker rods or other elongated workpieces which have at least one enlarged area located at some point therealong.

It has, therefore, been considered desirable to develop an arrangement which facilitates uniform induction heating of sucker rods and other workpieces of the type described. The subject new method is deemed to provide such an arrangement which successfully overcomes the foregoing problems and others.

BRIEF SUMMARY OF THE INVENTION

The present invention relates to inductively heating an elongated metal workpiece to a generally uniform temperature over the entire workpiece length and where at least one area of enlarged cross-section is included thereon. The method utilizes variations in the effective heating times for different areas or sections of the workpiece and is particularly adapted for use in heating sucker rods of the type employed in the petroleum industry.

According to the present invention, the method comprises the steps of:

(a) providing a multi-turn inductor generally coaxially around an elongated workpath and energized to some predetermined level;

(b) moving at least one of the inductor and workpiece relative to the other at some predetermined rate of travel along the workpath with the workpiece being sequentially placed in an inductively coupled relationship with the inductor to effect heating of the workpiece to generally a predetermined temperature; and, (c) reducing the rate of relative movement between the workpiece and inductor when the workpiece enlarged section is inductively coupled with the inductor for heating the enlarged section to generally the predetermined temperature.

According to a more specific aspect of the invention, the step of moving at least one of the inductor and workpiece relative to the other comprises feeding the workpiece along the workpath at some predetermined rate of travel toward and through the inductor.

According to yet another aspect of the invention, the step of reducing the rate of relative movement between the workpiece and inductor comprises moving the inductor along the workpath from a first position at some predetermined rate of travel in the same direction as the step of feeding the workpiece along the workpath.

In accordance with yet another aspect of the invention, the method further includes the steps of performing the step of moving the inductor along the workpath for a preselected time interval and thereafter returning the inductor toward the first position.

The principal object of the present invention is the provision of a new method which is extremely effective for purposes of inductively heating an elongated workpiece to a generally uniform temperature where the at least one enlargement is included along the workpiece length.

Another object of the invention is the provision of such a method for use in uniformly heating a sucker rod prior to performing a manufacturing operation thereon.

Still another object of the invention is the provision of a new method for uniformly heating an elongated workpiece which includes at least one area having an enlarged cross-section and wherein the workpiece heating and feed parameters may be adjusted to accommodate a variety of end results.

Further objects and advantages for the invention will become readily apparent to those skilled in the art upon a reading and understanding of the following specification.

BRIEF DESCRIPTION OF THE DRAWING

The invention may take physical form in certain parts and arrangements of parts, preferred and alternative embodiments of which will be described in detail in the following specification and illustrated in the accompanying drawings which form a part hereof and wherein:

FIG. 1 is a partial side elevational view of a sucker rod which is to be uniformly heated in accordance with the subject new method;

FIG. 2 is a schematic side elevational view of apparatus employed in practicing the new method;

DETAILED DESCRIPTION OF PREFERRED AND ALTERNATIVE EMBODIMENTS

Figure 3:
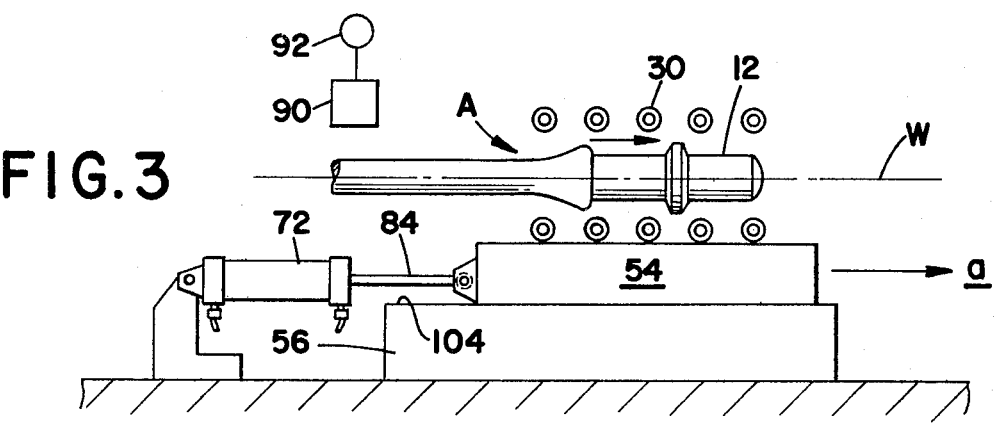
FIG. 3 is a partial view of the arrangement shown in FIG. 2 as the lead end of a sucker rod enters the inductor.

Referring now to the drawings wherein the showings are for purposes of illustrating preferred and alternative embodiments of the invention only and not for purposes of limiting same, FIG. 1 shows a sucker rod constructed from steel or other ferrous material and which includes an elongated main or central portion 10 having enlargements 12,14 at the opposed ends thereof. Central portion 10 may be circular, hexagonal or the like in cross-section and is generally uniform over the entire length. Enlargements 12,14 are similar to each other and include a bead portion 16, a wrench square or flats portion 18 and a box or pin blank 20. In the sucker rod A of FIG. 1, these blanks comprise pin blanks which will ultimately be machined to define threaded male pins. In this manner, a plurality of the sucker rods may be mechanically interconnected by female couplings to a desired overall length for use in an oil well. Typically, cross-sectional dimension of central portion 10 will range between 0.5"–1.125" with the maximum cross-sectional dimension of enlargements 12,14 generally ranging between 1.0"–2.25". The overall length of the rod is approximately 25'–30' with the length of each enlargement 12,14 being relatively small, i.e., on the order of magnitude of a few to several inches. It should be appreciated that other forms of sucker rods are also available. For example, some rods have a threaded male pin at one end and a female pin receiving box at the other to allow direct interconnection therebetween. The subject new heating method is, however, deemed equally applicable to use with this and other alternative forms of the rods.

During sucker rod manufacture and processing, it is desired to heat each rod to some uniform temperature for purposes of accommodating the application of a paint or plastic type coating thereto. In that regard, the steps of the subject new method are shown in FIGS. 2–6 for heating sucker rod A. In FIG. 2, an induction heating apparatus B is schematically shown and includes a multi-turn inductor generally designated 30.

This inductor is comprised of a cylindrical copper coil having a generally circular cross-section as is known in the art. The individual coils are laterally spaced apart from each other and are hollow for defining a continuous fluid passageway therethrough. The passageway accommodates a suitable coolant from a source (not shown) disposed adjacent to apparatus B as is also known in the art.

Inductor 30 is generally coaxially disposed about an elongated workpath W and includes entrance and exit ends 32,34. The distance between ends 32,34 is preferably about the same or slightly greater than the length of each enlargement 12,14. Leads 36,38 connect coil 30 with a power source 40. In accordance with the present invention, this power source may comprise a number of different types typically employed in induction heating devices and having appropriate output frequency and power capabilities required to perform the desired heating function. In addition, and because inductor 30 moves along workpath W during at least a portion of sucker rod heating, leads 36,38 are flexible in nature so as to not impair or impede such movement.

Inductor 30 may be advantageously disposed in an open ended housing 50 with this housing and the coil being operatively mounted to the upper surface portion 52 of an inductor carriage 54. This carriage is movably mounted to a frame 56 which, in turn, is fixedly secured to a base 58 such as the floor or the like. Carriage 54 is positioned on frame 56 so that inductor 30 may be selectively moved coaxial of workpath W. While a sliding relationship between the carriage and frame has been shown in the schematic view of FIG. 2, it will be readily appreciated that the carriage may be mounted on bearings, guideways or the like without in any way departing from the overall intent or scope of the present invention.

A carriage drive means generally designated 70 is disposed in operative communication with the rear end of carriage 54 for selectively moving the carriage in a manner to be described. As shown, this drive means is comprised of a pneumatic or hydraulic drive cylinder 72 having a rear clevis 74 conventionally secured to a fixed pedestal 76. A rod end clevis 78 is likewise conventionally secured to carriage 54. Fluid supply lines 80,82 are employed to selectively permit application of pneumatic or hydraulic pressure to the opposite sides of the cylinder piston (not shown) from a convenient source (not shown) as is conventional for driving cylinder rod 84 outwardly from the cylinder body or drawing it inwardly into the body. As is also conventional, the rate of fluid passage outwardly from the cylinder through supply lines 80,82 may be regulated for purposes of controlling the speed with which cylinder rod 84 is extended and/or retracted. In addition to a drive cylinder, other carriage drive means may also be advantageously employed. Chain drives, screw drives, motor drives and the like may all be satisfactorily employed without in any way departing from the overall intent or scope of the invention.

A sensing means 90 which may comprise a limit switch, proximity switch, micro switch or the like is disposed in close operative association with workpath W. This sensing means is spaced approximately 2' in front of inductor 30, although other arrangements could be suitably employed. This sensing means senses the presence of sucker rod enlargements 12,14 as the rod travels longitudinally along the workpath and controls activation of carriage drive means 70. A time delay 92 is advantageously included for providing an adjustable time interval between activation of sensing means 90 and energization of carriage drive means 70. This then allows the enlargements 12,14 to pass by the sensing means and into an inductively coupled relationship with inductor 30 as will be described.

Finally, a workpiece support is provided for moving the sucker rod longitudinally along workpath W. This support may comprise any number of different types or styles and is schematically shown in FIG. 2 by a plurality of support rollers 100. These rollers are sufficient in number and spaced apart from each other by an appropriate distance to maintain adequate support for the sucker rod over the entire length thereof. In addition, the sucker rod is moved along workpath W at some preselected rate of travel by drive means (not shown) associated with support rollers 100. Many other alternative arrangements known in the art may be used for this purpose and do not depart from the overall intent of the present invention.

With reference to FIGS. 2-6, description will hereinafter be made to practicing the subject new method in heating a sucker rod A. In FIG. 2, the sucker rod is advanced longitudinally along workpath W at some preselected rate of travel. As enlargement 12 located at the leading end of the sucker rod approaches sensing means 90, the sensing means is activated. Activation of the sensing means causes carriage drive means 70 to be energized after some predetermined time delay as controlled by time delay 92. During this delay, the sucker rod continues along workpath W toward an inductively coupled relationship with inductor 30. The inductor is, of course, energized at this time by power source 40 to some preselected level for obtaining the desired induction heating for the rod along central portion 10 thereof. Because enlargement 12 has a greater cross-sectional area than the central portion, it is necessary to increase the effective heating time in order to obtain the same degree of heating as is obtained for central portion 10.

For that purpose, and with reference to FIG. 3, once a sufficient time interval has elapsed from tripping or activation of sensing means 90 to allow entry of enlargement 12 into inductor 30, drive cylinder 72 is energized and begins to move inductor carriage 54 forwardly in the same direction of travel and at generally the same speed as the sucker rod. As shown in FIG. 3, inductor carriage 54 is being moved in direction a from its normal or home position 104 under the influence of cylinder rod 84. Such movement of carriage 54 along with the sucker rod continues for a preselected period of time until the desired temperature for enlarged area 12 is obtained within predetermined upper and lower tolerances.

Figure 4:
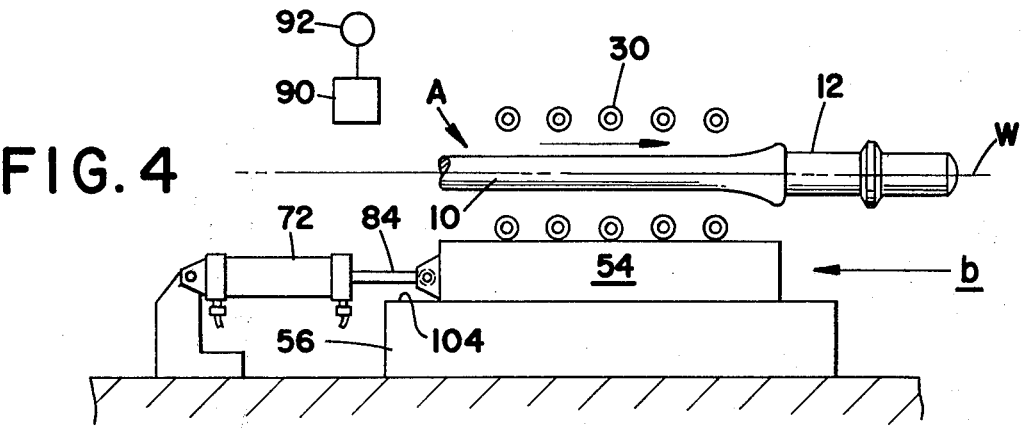
FIG. 4 is a view similar to FIG. 3 with the lead end of the sucker rod passing outwardly from the inductor and the inductor being simultaneously moved along the workpath in an opposite direction.

After the predetermined time interval required to heat enlargement 12 to the desired temperature, drive cylinder 72 is oppositely energized to pull inductor carriage 54 in the opposite direction b back toward home position 104. This aspect of the method is shown in FIG. 4. At the same time, sucker rod A continues along workpath W at the preselected rate of travel so that elongated central portion 10 will be sequentially heated as it passes through inductor 30. Because of the length of this section, i.e., approximately 25' or so, there is plenty of time available for returning inductor carriage 54 to home position 104. Thus, it is considered particularly desirable to allow such return at a relatively slow rate of speed so that the entirety of central portion 10 will be uniformly heated.

Figure 5:
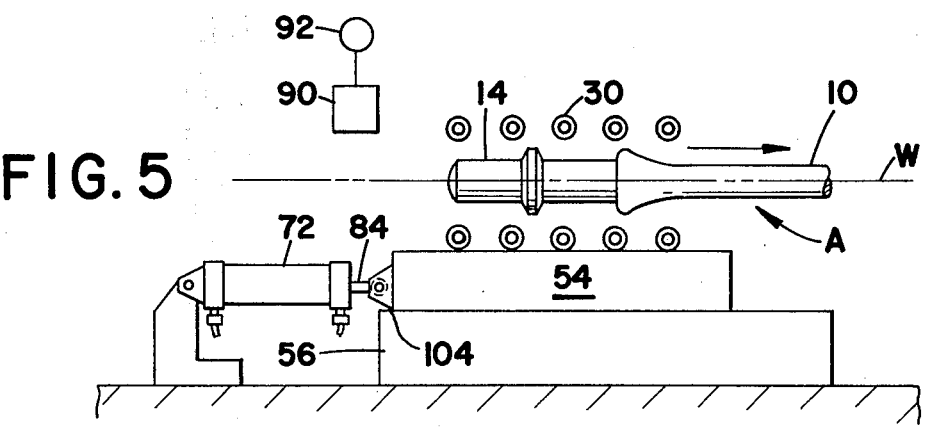
FIG. 5 is a view similar to FIG. 3 with the rear end of the sucker rod entering the inductor.
Figure 6:
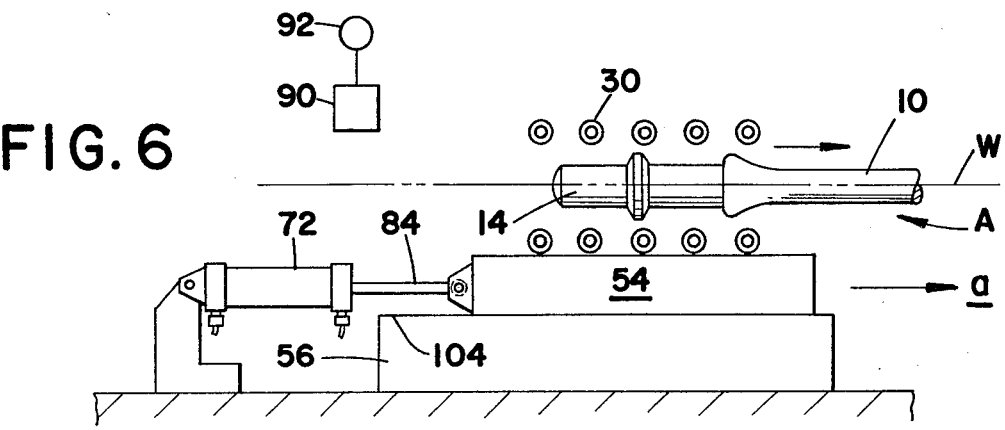
FIG. 6 is also a view similar to FIG. 3 showing the rear end of the workpiece and the inductor being simultaneously moved in the same direction along the workpath.

FIG. 5 shows enlargement 14 after it has activated sensing means 90 and has entered inductor 30 in the same manner previously described with reference to enlargement 12. At this juncture drive cylinder 72 is again energized for moving inductor carriage 54 forwardly from position 104. This movement is schematically designated by arrow a in FIG. 6. At the end of a preselected time interval substantially identical to that required for enlarged area 12, drive cylinder 72 is energized in the opposite direction so as to again return inductor carriage 54 back toward home position 104. This movement is similar to that shown in FIG. 4. However, since the inductor is no longer performing a heating function once enlargement 14 exits therefrom, the inductor carriage return rate of travel may be at a faster rate of speed. This is considered particularly desirable for purposes of minimizing the delay which would otherwise be present before the next adjacent sucker rod could be heated. The next adjacent rod along with subsequent rods may be heated in the same manner and fashion described above.

Referring again to FIG. 2, and following sucker rod heating, the rod passes into coating apparatus C for receiving a paint or plastic type of coating. Typically, this apparatus will comprise an electrostatic spraying chamber spaced several feet from induction heating apparatus B and which does not, in and of itself, comprise a part of the present invention. Accordingly, it has not been described in detail herein. In addition, other types of apparatus may be easily substituted for the coating apparatus when the broad concept of the new method is adapted to use in other environments and applications.

It has been found that in using the new method for heating a sucker rod, uniform heating of the entire rod may be advantageously obtained. In this environment, a temperature in excess of 400° F. is desired. With the new method, uniform heating well within the acceptable ±25° F. tolerances for the target temperatures are realized.

By way of further example, it was desired to employ a sucker rod feed rate along the workpath W of approximately 25 feet per minute using a multi-turn inductor 30 of approximately 6" in length and to uniformly heat the entire rod to approximately 400° F. The rod main or central portion 10 had a cross-sectional dimension of 0.75" and was hexagonal in conformation. To obtain satisfactory results within accepted tolerances, sucker rod enlargements 12,14 each required a heating time of approximately 3.0-3.5 seconds. Since it takes approximately 2.0 seconds for each enlargement to pass longitudinally through the inductor, it was necessary to advance the inductor, i.e., carriage 54 forwardly from its home position for approximately 1.5 seconds. At a rate of travel generally equal to the sucker rod feed rate, i.e., 25 feet per minute, the length of carriage travel required is approximately 7.5". These parameters may and will be varied with different sized sucker rods, other types of workpieces, variations in workpiece feed rates, variations in the inductor characteristics, and the like. Such variations are, however, deemed to come within the intent and scope of the present invention.

Figure 7:
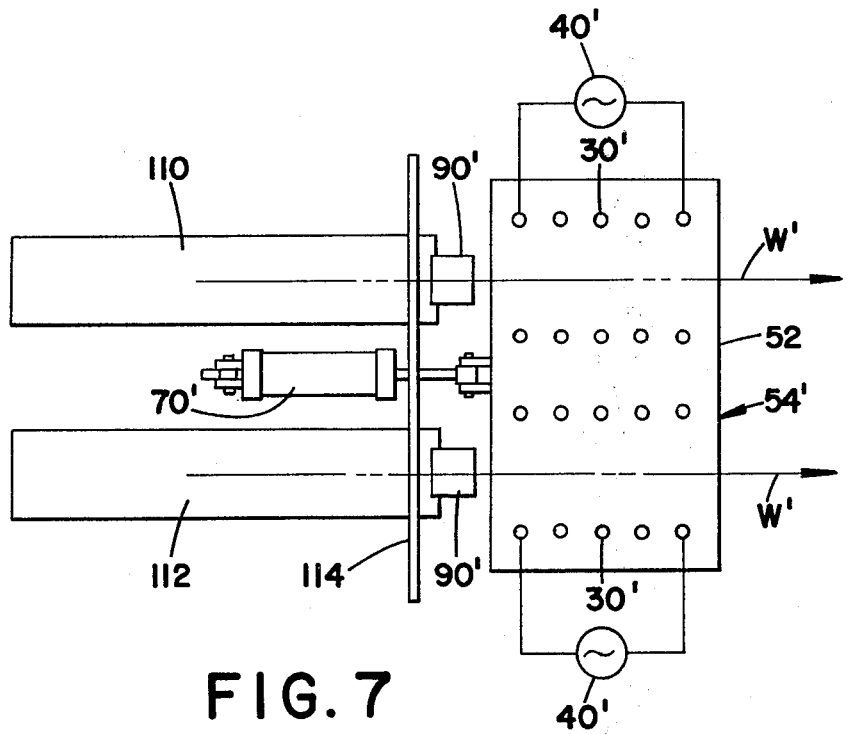
FIG. 7 is a schematic plan view showing an alternative arrangement for inductively heating a pair of sucker rods to a uniform temperature; and, FIG. 8 is a schematic plan view of another alternative arrangement for simultaneously heating a pair of sucker rods.

FIG. 7 is a schematic plan view of a slight modification utilized in practicing the subject new method. For ease of illustration and appreciation of this modification, like components are identified by like numerals with a primed (') suffix and new components are identified by new numerals.

In this FIG. 7, a pair of multi-turn inductors 30' are disposed in a transversely spaced apart relationship on inductor carriage 54' and thus define a pair of parallel spaced apart workpaths W'. As shown, each inductor is energized by a separate power source 40', although it will be appreciated that the coils may be electrically interconnected and powered by a single source if so desired. A pair of sucker rod support and feed mechanisms 110,112 are shown in an axially aligned relationship with inductors 30' and a sensing means 90' is disposed adjacent each inductor to sense the sucker rod enlargements as they are fed along workpaths W'. Carriage drive means 70' is adapted to urge inductor carriage 54' forwardly of and rearwardly toward a home position as previously described. The arrangement of FIG. 7 thus accommodates simultaneous heating of a pair of sucker rods in a manner substantially similar to that previously described. However, in order to insure that the sucker rods will simultaneously enter their associated inductors during the heating cycle, a movable gate or stop 114 is disposed across both of workpaths W' immediately adjacent sensing means 90'. When both rods engage the gate or stop, it is raised or otherwise removed to again permit feeding of the rods toward and through the inductors. If desired, operation of gate or stop 114 may advantageously be by automatic means. Such means is to be the subject of a separate patent application.

Figure 8:
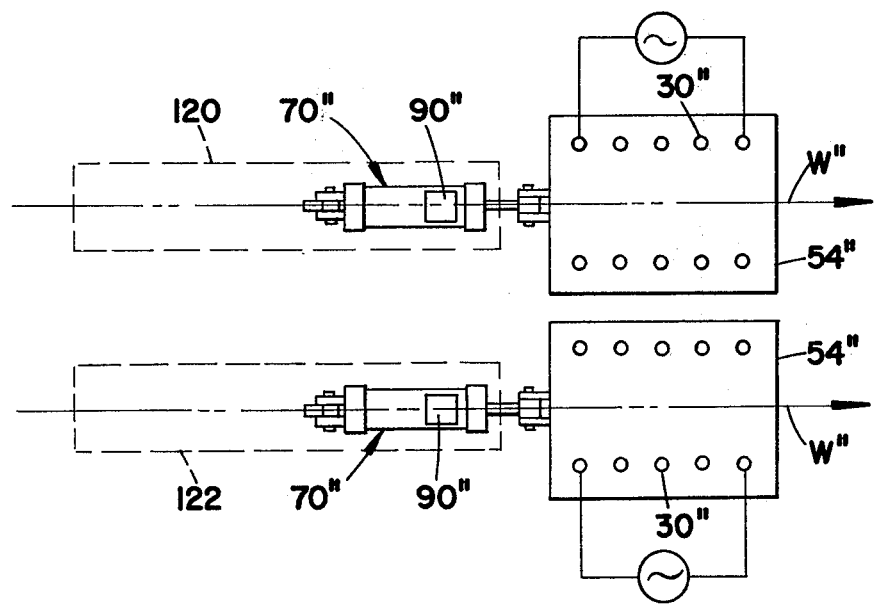

Still another alternative arrangement for processing a pair of sucker rods is schematically shown in FIG. 8. Here, like components are identified by like numerals with a double primed (") suffix and new components are identified by new numerals.

In this FIG. 8, a pair of inductors 30" are operatively mounted on separate inductor carriages 54". Each carriage, in turn, is selectively movable by separate drive means 70" and a sensing means (not shown) is again disposed adjacent the entrance end of each inductor. Sucker rod support and feed means 120,122 guide the rods along parallel spaced apart workpaths W"'. Here, the sucker rods may be heated independently of each other as they travel along their respective workpaths. As a result, it is not necessary to feed them into and through their associated inductors in a substantially simultaneous fashion.

The invention has been described with reference to preferred and alternative embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A method for effecting uniform induction heating of an elongated workpiece which includes a first portion having a substantially uniform cross-section over a major portion of the workpiece length and a second portion having a larger cross-section than said first portion, said method comprising the steps of:
   (a) providing a multi-turn inductor generally coaxially disposed about and movable along an elongated workpath and adapted to be energized to a predetermined level;
   (b) continuously feeding said workpiece at a predetermined constant rate of travel longitudinally along said workpath in a feed direction toward and through said inductor, while the inductor is continuously energized to said predetermined level, for continuously inductively heating the advancing workpiece along the length thereof and sequentially heating the entirety of said workpiece first portion generally to a predetermined desired temperature; and,
   (c) moving said inductor in said feed direction along with said workpiece from a first position along said workpath, while the said workpiece second portion is inductively coupled with said energized inductor, to reduce the rate of relative movement between said workpiece and inductor to a preselected level for increasing the effective heating time for said workpiece second portion, whereby said workpiece second portion is also heated to generally said predetermined temperature.

2. The method as defined in claim 1 further including the step of controlling the time interval during which the said inductor is moved in said workpiece feed direction.

3. The method as defined in claim 1 wherein said step of moving said inductor in said feed direction comprises substantially eliminating relative movement between said inductor and workpiece for a predetermined time interval.

4. The method as defined in claim 1 further including the steps of moving said inductor in said feed direction along with said workpiece for a predetermined time interval while the workpiece is inductively coupled with the energized inductor, and thereafter returning said inductor to said first position.

5. The method as defined in claim 4 wherein said step of returning said inductor to said first position is performed at a different speed than that at which said inductor is moved in said feed direction.

6. A method for the uniform induction heating of an elongated workpiece such as a sucker rod and the like having a substantially uniform cross-section over a major portion of the workpiece length and having a larger cross-section than said major portion along at least one minor portion of the workpiece length, said method comprising the steps of:
   (a) providing a multi-turn inductor generally concentric with an elongated workpath and having opposed entrance and exit ends;
   (b) continuously feeding said workpiece longitudinally along said workpath at a predetermined constant rate of travel in a feed direction toward and through said inductor from the entrance end thereof;
   (c) energizing said inductor to a preselected level at least during said workpiece feeding step to effect induction heating of said workpiece;
   (d) moving said inductor along said workpath in the same direction as said workpiece feed direction from a first normal position along said workpath for a predetermined time interval while said workpiece minor portion is inductively coupled with said energized inductor for increasing the effective heating time for said minor portion, whereby said major and minor portions are uniformly heated to generally the same predetermined temperature; and,
   (e) thereafter returning said inductor to said first position.

7. The method as defined in claim 6 wherein the said steps of feeding the workpiece, energizing the inductor, and moving and returning said inductor are performed for each of a plurality of substantially identical workpieces.

8. The method as defined in claim 6 wherein the said feeding of said workpiece and moving of said inductor are performed at generally the same rate of travel.

9. The method as defined in claim 8 further including the step of sensing said minor workpiece portion prior to the feeding thereof into said inductor, and initiating said step of moving said inductor following a predetermined time delay after sensing.

10. The method as defined in claim 6 wherein the said returning of the inductor to said first position is performed at a different rate of travel than that at which said inductor is moved in said feed direction.

11. The method as defined in claim 6 wherein said elongated workpiece includes a first minor portion adjacent one end of the workpiece and a second minor portion adjacent the other end, and said steps of moving and returning said inductor are performed for each of said first and second minor portions.

12. The method as defined in claim 11 wherein said step of returning said inductor to said first position, after heating the workpiece minor portion last fed to said inductor during the said feeding of the workpiece through the inductor, is performed at a faster rate of travel than the step of returning the inductor after heating the other said minor portion.

13. Apparatus for inductively heating an elongated workpiece with a multi-turn induction heating coil having an entrance end, and exit end, and an elongated workpiece receiving passageway, said workpiece having at least one enlarged portion and an elongated body portion having a generally uniform cross-section wherein uniform heating of said workpiece by said coil requires heating of said enlarged portion for a longer effective heating time with a predetermined power level of said coil at a given constant feed rate than said body portion with said predetermined power level at said feed rate, said apparatus comprising: a power supply connected to said coil and having a power output at said predetermined power level for energizing said coil, means for continuously conveying said workpiece longitudinally through said passageway at said constant feed rate along a feed path extending in a direction from said entrance end of the coil to said exit end and while said coil is continuously energized by said power supply; sensing means for creating a signal when said workpiece enlarged portion reaches a known position on said feed path adjacent said entrance end; and, means responsive to said signal and operative after a predetermined first time interval following creation of said signal for shifting said coil along said feed path and along with said workpiece at least when said workpiece enlarged portion is in said coil, said coil being shifted from a first normal position along said feed path at a given advance travel rate for a predetermined second time interval.

14. The apparatus as defined in claim 13 wherein said shifting means moves said coil back to said first normal position at a return rate of travel following said second time interval, said workpiece feed rate and coil advance travel rate being generally the same.

15. The apparatus as defined in claim 14 wherein said shifting means is operative to cause said coil advance travel rate and said coil return travel rate to be different from each other.

16. The apparatus as defined in claim 14 wherein said elongated workpiece has two enlarged end portions separated by said body portion, with one end portion comprising a leading end and the other end portion comprising a trailing end, said sensing means creating a signal when each of said leading and trailing ends reaches a known position along said feed path so that said shifting means will shift said coil at said advance travel rate after said first time interval in response to the signal created by said sensing means on actuation by each of said leading and trailing workpiece ends, said coil return rate being greater following coil shifting in response to said trailing end than following coil shifting in response to said leading end.

* * * * *